United States Patent
Nogawa (10) Patent No.: US 11,139,737 B2
(45) Date of Patent: *Oct. 5, 2021

(54) REGULATOR CONTROL INTEGRATED CIRCUIT HAVING COT AND VALLEY CURRENT MODES

(71) Applicant: Active-Semi, Inc., Tortola (VG)

(72) Inventor: Masashi Nogawa, Sachse, TX (US)

(73) Assignee: Active-Semi, Inc., Tortola (VG)

( * ) Notice: Subject to any disclaimer, the term of this patent is extended or adjusted under 35 U.S.C. 154(b) by 178 days.

This patent is subject to a terminal disclaimer.

(21) Appl. No.: 16/428,900

(22) Filed: May 31, 2019

(65) Prior Publication Data

US 2019/0288602 A1    Sep. 19, 2019

Related U.S. Application Data

(63) Continuation of application No. 15/828,337, filed on Nov. 30, 2017, now Pat. No. 10,340,797.

(51) Int. Cl.
| | | |
|---|---|---|
| *H02M 3/158* | (2006.01) | |
| *H02M 3/157* | (2006.01) | |
| *H02M 1/00* | (2006.01) | |
| *H02M 3/156* | (2006.01) | |

(52) U.S. Cl.
CPC .......... *H02M 3/158* (2013.01); *H02M 3/157* (2013.01); *H02M 1/0009* (2021.05); *H02M 1/0025* (2021.05); *H02M 3/1566* (2021.05)

(58) Field of Classification Search
None
See application file for complete search history.

(56) References Cited

U.S. PATENT DOCUMENTS

| | | | | |
|---|---|---|---|---|
| 6,127,815 A | * | 10/2000 | Wilcox ................. | H02M 3/156 323/282 |
| 7,307,481 B1 | * | 12/2007 | Bell ..................... | H03K 3/0231 323/282 |
| 7,573,246 B2 | | 8/2009 | Lin et al. ...................... | 323/273 |
| 9,444,338 B1 | | 9/2016 | Pastorina et al. | |
| 2005/0231181 A1 | | 10/2005 | Bernacchia et al. ......... | 323/274 |

(Continued)

OTHER PUBLICATIONS

Allegro Microsystems, LLC, "Valley Current Mode Control Buck Converter", 2008-2013 (16 pages).

*Primary Examiner* — Jeffrey A Gblende
(74) *Attorney, Agent, or Firm* — Withrow & Terranova, PLLC (57) ABSTRACT

A voltage regulator control integrated circuit includes constituent parts including an error amplifier circuit, a comparator circuit, a compensation signal generator circuit, an oscillator/one-shot circuit, a latch, and a current sense circuit. In a first example, the integrated circuit is operable in a first mode and in a second mode. In the first mode, the various parts are configured and interconnected in such a way that they operate together as a valley current mode regulator control circuit. In the second mode, the various parts are configured and interconnected in such a way that they operate together as a current-mode constant on-time mode regulator control circuit. In another example, a voltage regulator control integrated circuit has the same basic constituent parts and is operable in a first mode as a peak current mode regulator control circuit, or in a second mode as a constant off-time time mode regulator control circuit.

21 Claims, 9 Drawing Sheets

REGULATOR HAVING PEAK CURRENT MODE AND A C-M CONSTANT OFF-TIME MODE (56) References Cited

U.S. PATENT DOCUMENTS

| | | | |
|---|---|---|---|
| 2011/0089918 A1 | 4/2011 | Chang | 323/282 |
| 2013/0051089 A1* | 2/2013 | Pan | H02M 1/44 |
| | | | 363/21.17 |
| 2013/0342181 A1 | 12/2013 | Suppanz et al. | 323/271 |
| 2014/0062431 A1 | 3/2014 | Yanase et al. | 323/271 |
| 2014/0132236 A1* | 5/2014 | Darmawaskita | H02M 3/156 |
| | | | 323/283 |
| 2015/0365000 A1 | 12/2015 | Dhuyvetter et al. | 323/271 |
| 2016/0315538 A1 | 10/2016 | Nguyen et al. | |
| 2017/0317587 A1* | 11/2017 | Zhang | G01R 19/003 |

\* cited by examiner

REGULATOR HAVING A VC MODE AND A CM-COT MODE

CM-COT MODE - SWITCHES SET TO "B"

FIG. 3

EXAMPLE OF THE SUMMING CIRCUIT
FIG. 4

EXAMPLE OF THE COMPENSATION
SIGNAL GENERATOR
FIG. 5

COMPENSATION SIGNAL
GENERATOR CIRCUIT SIGNALS
FIG. 6

ANOTHER EXAMPLE OF THE
CURRENT SENSE CIRCUIT

FIG. 7

ANOTHER EXAMPLE OF THE
CURRENT SENSE CIRCUIT

FIG. 8

ANOTHER EXAMPLE OF THE
CURRENT SENSE CIRCUITRY

FIG. 9

THE COMPENSATION SIGNAL $V_C$ CAN BE
SUMMED WITH THE $V_{CURRENT}$ SIGNAL BY
INVERTING THE RAMP SIGNAL

FIG. 10

ANOTHER EXAMPLE OF THE
OSC/ONE-SHOT CIRCUIT

FIG. 11

ANOTHER EXAMPLE OF THE SETTING AND
RESETTING OF THE SEQUENTIAL LOGIC ELEMENT

FIG. 12

REGULATOR HAVING PEAK CURRENT MODE AND A C-M CONSTANT OFF-TIME MODE

FIG. 13

PEAK CURRENT MODE - SWITCHES SET TO "A"

REGULATOR CONTROL INTEGRATED CIRCUIT HAVING COT AND VALLEY CURRENT MODES

CROSS REFERENCE TO RELATED APPLICATIONS

This application is a continuation of, and claims priority under 35 U.S.C. § 120 from, nonprovisional U.S. patent application Ser. No. 15/828,337 entitled "Regulator Control Integrated Circuit Having COT and Valley Current Modes," filed on Nov. 30, 2017, now U.S. Pat. No. 10,340,797. The entire subject matter of the aforementioned patent document is incorporated herein by reference.

TECHNICAL FIELD

The present disclosure relates generally to regulators, and more particularly voltage regulator control circuits, and to related circuits and methods.

BACKGROUND INFORMATION

A DC-to-DC converter is a circuit that typically has a control loop or multiple nested control loops. There are various types of control loops and control loop architectures that can be employed. One class of control loop is the so-called current mode control loop. Within the general class of current mode control loops, there are various subcategories including include peak, valley, average, hysteretic, constant on-time, constant off-time, and emulated current mode. Some of these control mode types may be more advantageous in certain applications, whereas other control mode types may be more advantageous in other applications. The various control loop techniques have different characteristics, which may translate into advantages and disadvantages depending on the application.

SUMMARY

In a first novel aspect, a power converter circuit such as a DC-to-DC converter includes a voltage regulator control integrated circuit. This voltage regulator control integrated circuit is operable in a valley current (VC) mode or in a current-mode constant on-time mode (CM-COT). In one example, the voltage regulator control integrated circuit is programmable and has a mode control conductor and a mode control integrated circuit terminal MODE. The term "operable" as it is used here means programmably operable in that the voltage regulator control integrated circuit has the circuitry to operate in both modes and can be easily switched from operating in one mode to operating in the other mode, even though the mode control conductor and/or mode control terminal may be hardwired or otherwise permanently connected so that that particular instance of the voltage regulator control integrated circuit always operates in only one of the two modes.

The voltage regulator control integrated circuit includes a feedback integrated circuit terminal FB, a compensation integrated circuit terminal COMP, a switching integrated circuit terminal SW, a supply input voltage integrated circuit terminal VIN, a ground integrated circuit terminal GND, a mode control integrated circuit terminal MODE, an error amplifier circuit, a comparator circuit, a compensation signal generator circuit, an oscillator/one-shot circuit, a latch, a current sense circuit, an inverter, a high side switch HSS, and a low side switch LSS. In the VC mode, the compensation signal generator circuit outputs a ramp signal, whereas in the CM-COT mode the compensation signal generator circuit outputs an AC ground signal. In the VC mode, the oscillator/one-shot circuit outputs a free-running oscillating signal, whereas in the CM-COT mode the oscillator/one-shot circuit outputs a delayed one-shot signal.

In the VC mode, the various parts of the voltage regulator control integrated circuit (including the error amplifier circuit, the compensation signal generator circuit, the comparator circuit, the current sense circuit, the oscillator/one-shot circuit, and the latch) are configured and are intercoupled in such a way that they operate together as a VC mode regulator control circuit. The overall DC-to-DC converter therefore is controlled using a VC mode control loop.

In the CM-COT mode, the various parts of the voltage regulator control integrated circuit are configured and are intercoupled in such a way that they operate together as a CM-COT mode regulator control circuit. The overall DC-to-DC converter therefore is controlled using a CM-COT mode control loop.

In a second novel aspect, a power converter circuit includes a voltage regulator control integrated circuit. This voltage regulator control integrated circuit is operable in a peak current mode or in a current-mode constant off-time mode. The voltage regulator control integrated circuit includes a feedback integrated circuit terminal FB, a compensation integrated circuit terminal COMP, a switching integrated circuit terminal SW, a supply input voltage integrated circuit terminal VIN, a ground integrated circuit terminal GND, a mode control integrated circuit terminal MODE, an error amplifier circuit, a comparator circuit, a compensation signal generator circuit, an oscillator/one-shot circuit, a latch, a current sense circuit, an inverter, a high side switch HSS, and a low side switch LSS. In the peak current mode, the compensation signal generator circuit outputs a ramp signal, whereas in the current-mode constant off-time mode the compensation signal generator circuit outputs an AC ground signal. In the peak current mode, the oscillator/one-shot circuit outputs a free-running oscillating signal, whereas in the current-mode constant off-time mode the oscillator/one-shot circuit outputs a delayed one-shot signal. As is the case with the integrated circuit of the first novel aspect, a given instance of the integrated circuit of the second novel aspect may be hardwired so that it only operates in one of the two modes. Other instances of the same integrated circuit design may then be hardwired so that they only operate in the other of the two modes.

In the first and second novel aspect, although an example of the overall DC-to-DC converter is described in which there is a voltage regulator control integrated circuit, the control circuitry of the DC-to-DC converter can also be implemented with separate components and/or multiple different integrated circuits. Various subparts of the novel control circuitry can be integrated and other subparts not. For example, a voltage regulator control integrated circuit as described above may be provided, but the oscillator circuit may be located off chip. In one example, a voltage regulator control integrated circuit as described above is provided, but the current sense circuit is located off chip. The novel voltage regulator control circuit can also be implemented in discrete form without any special integrated circuit.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
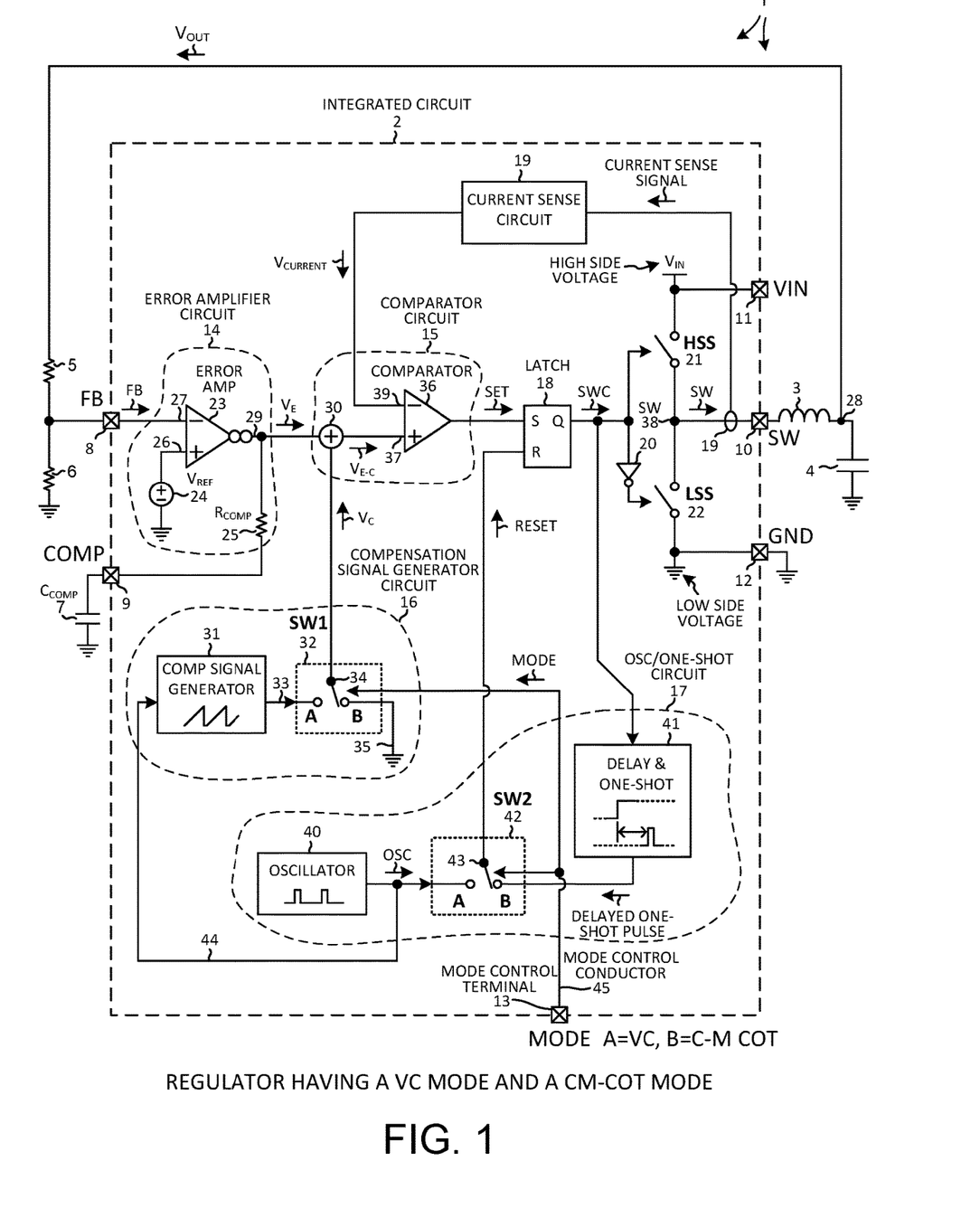
FIG. 1 is a circuit diagram of a circuit involving a novel voltage regulator control integrated circuit in accordance with a first novel aspect.

FIG. 1 is a diagram of a DC-to-DC voltage converter circuit 1 in accordance with a first novel aspect. Circuit 1 includes a voltage regulator control integrated circuit 2, an inductor 3, an output capacitor 4, feedback voltage divider resistors 5 and 6, and an external compensation capacitor 7. Voltage regulator control integrated circuit 2 includes a feedback integrated circuit terminal FB 8, a compensation integrated circuit terminal COMP 9, a switching integrated circuit terminal SW 10, a supply input voltage integrated circuit terminal VIN 11, a ground integrated circuit terminal GND 12, a mode control integrated circuit terminal MODE 13, an error amplifier circuit 14, a comparator circuit 15, a compensation signal generator circuit 16, an oscillator/one-shot circuit 17, a latch 18, a current sense circuit 19, an inverter 20, a high side switch HSS 21, and a low side switch LSS 22.

The voltage regulator control integrated circuit 2 is actually packaged in an integrated circuit package (not shown) that has a set of integrated circuit package terminals (not shown). In this example, there is a one-to-one correspondence between the integrated circuit terminals 8-13 shown and the corresponding integrated circuit package terminals. It is the integrated circuit package terminals that actually couple most directly to the external components 3-7. The external components 3-7 are typically soldered, along with the packaged voltage regulator control integrated circuit, on a printed circuit board (not shown). For simplicity of explanation, the extra connections of the package between the integrated circuit terminals and the external components are omitted from the description and explanation below, but it is understood that these connections and structures exist.

Error amplifier circuit 14 includes a differential transconductance amplifier 23, a voltage reference generator 24, and a compensation resistor $R_{COMP}$ 25. Compensation resistor $R_{COMP}$ 25 and external compensation capacitor $C_{COMP}$ 7 together form an RC compensation network that is coupled to the output lead 29 of amplifier 23. The voltage reference generator 24 supplies a 1.2 volt reference voltage onto the non-inverting input lead 26 of amplifier 23. The inverting input lead 27 of amplifier is coupled to the feedback integrated circuit terminal FB 8. A fraction of the output voltage $V_{OUT}$ on node 28 is supplied by the voltage divider involving resistors 5 and 6 onto the feedback integrated circuit terminal FB 8, and to the inverting input lead 27 of amplifier 23. The error amplifier circuit 14 supplies an error voltage signal $V_E$ to the summing circuit 30 of the comparator circuit 15.

Compensation signal generator circuit 16 includes a compensation signal generator circuit 31 and a switch SW1 32. The compensation signal generator circuit 16 supplies a compensation voltage signal $V_C$ to the summing circuit 30 of the comparator circuit 15. Compensation signal generator 31 supplies a ramp voltage signal via conductor 33 to switch SW1 32. The overall circuit 1 is operable in a valley current (VC) mode and in a current-mode constant on-time (CM-COT) mode. For brevity reasons, the CM-COT mode may sometimes be denoted the COT mode in the description below. In the VC mode, the switch SW1 32 is in the "A" position. The switch SW1 32 therefore couples the ramp voltage signal as output by the compensation signal generator circuit 16 onto the switch output node 34. The compensation voltage signal $V_C$ is therefore the ramp signal when the circuit is in the VC mode. In the COT mode, the switch SW1 32 is in the "B" position. The switch SW1 32 therefore couples a ground conductor 35 to the switch output node. The compensation voltage signal $V_C$ is therefore ground potential when the circuit is in the COT mode. The potential on ground conductor 35 is also more generally referred to as an AC ground signal.

Comparator circuit 15 includes the summing circuit 30 and a differential comparator 36. The summing circuit 30 receives the error voltage signal $V_E$ from the error amplifier circuit 14 and receives the compensation voltage signal $V_C$ from the compensation signal generator circuit 16, and supplies an error and compensated error voltage signal $V_{E-C}$ onto the non-inverting input lead 37 of comparator 36. This signal $V_{E-C}$ is also referred to as the compensated error signal $V_{E-C}$. The current sense circuit 19 outputs a voltage signal $V_{CURRENT}$ whose magnitude is indicative of a magnitude of a current SW. This current SW is flowing from switching node SW 38 and through integrated circuit terminal SW 10 and then through the external inductor 3. The voltage signal $V_{CURRENT}$ is supplied by the current sense circuit 19 onto the non-inverting input lead 39 of comparator 36. Comparator 36 supplies a set signal SET onto the set input lead of the latch 18.

The current sense circuit 19 is illustrated in general schematic form. The actual current sense circuit and circuitry can take one of several different suitable forms. For example, the current sense circuit 19 can include a sense resistor that is disposed in the current path of the SW current, and the voltage drop across this sense resistor can be obtained and converted into the voltage signal $V_{CURRENT}$. For example, the current sense circuit 19 can include a current mirror that mirrors the SW current, and this mirror current can in turn be converted into the voltage signal $V_{CURRENT}$. Actual current flow between the switching node SW 38 and the integrated circuit terminal SW 10 need not be sensed directly, but rather another voltage or signal can be sensed that is indicative of the magnitude of the current SW. For example, one of the high side switch HSS 21 and low side switch LSS 22 may be a transistor that has a companion smaller current mirror transistor, and the current flow through this companion current mirror transistor can be sensed and converted into the voltage signal $V_{CURRENT}$.

Osc/one-shot circuit 17 includes an oscillator circuit 40, a delay and one-shot circuit 41, and a switch 42. Osc/one-shot circuit 17 supplies a reset signal RESET onto the reset input lead of the latch 18.

When the overall circuit is operating in the valley current (VC) mode, the switch 42 is switched to the "A" position so that it couples a fixed frequency free-running oscillating signal OSC as output from the oscillator 40 onto the switch output node 43. The reset signal RESET is therefore the free-running oscillating signal OSC when the circuit is in the VC mode. The free-running oscillating signal OSC is a pulse train of narrow pulses. The period of the oscillating signal OSC is one microsecond. The oscillating signal OSC is also supplied via conductor 44 to the compensation signal generator 31 so that pulses of the oscillating signal will initiate voltage ramps of the ramp signal as output by the compensation signal generator 31. A rising edge of the oscillating signal OSC causes the compensation signal generator 31 to output a voltage ramp. For the first five nanoseconds, the voltage level of the ramp signal starts at zero volts and does not change, but then after the initial five nanosecond period the voltage of the ramp signal increases at a rate of 100 kV per second.

When the overall circuit is operating in the constant on-time (COT) mode, the switch 42 is switched to the "B" position so that it couples a delayed one-shot pulse signal as output by the delay and one-shot circuit 41 onto the switch output node 43. The reset signal RESET is therefore the delayed one-shot pulse signal when the circuit is in the COT mode. The delay and one-shot circuit 41 detects rising edges of the switch control signal SWC as output by latch 18. If the delay and one-shot circuit 41 detects a rising edge, then after a "fixed delay time" (from the rising edge) it outputs one high pulse. The high pulse is also of a fixed predetermined duration. All such high pulses output by circuit 41 are of the same fixed predetermined duration. The term "fixed delay time" as it is used here means fixed from the perspective of the control loop, but the fixed delay time is selected using a lookup table. Based on: 1) a desired target output voltage $V_{OUT}$, 2) the magnitude of the input voltage VIN, 3) the current operating temperature of the integrated circuit, and 4) the target operating switching frequency, the lookup table outputs a digital value that in turn sets the fixed delay time. The term "constant" in the larger term "constant on-time control mode" refers to the fact that this delay time is "fixed", as the "delayed one-shot pulse" signal is output by the delay and one-shot circuit 41.

Latch 18 is a digital SR latch. The switch control signal SWC as output by the latch 18 is a digital signal. When the switch control signal SWC is at a digital logic high level, the high side switch HSS 21 is on and conductive. The low side switch LSS 22 is off and non-conductive due to the inverter 20 inverting the control signal for the low side switch. When the switch control signal SWC is at a digital logic low level, the low side switch LSS 22 is on and conductive and the high side switch HSS 21 is off and non-conductive. The high side and low side switches are illustrated in general schematic form. There are various ways of implementing these switches. In one example, both the switches HSS 21 and LSS 22 are N-channel field effect transistors. There are several suitable gate drive and bootstrap circuits for driving these transistors. This circuitry is conventional and is not illustrated.

Figure 2:
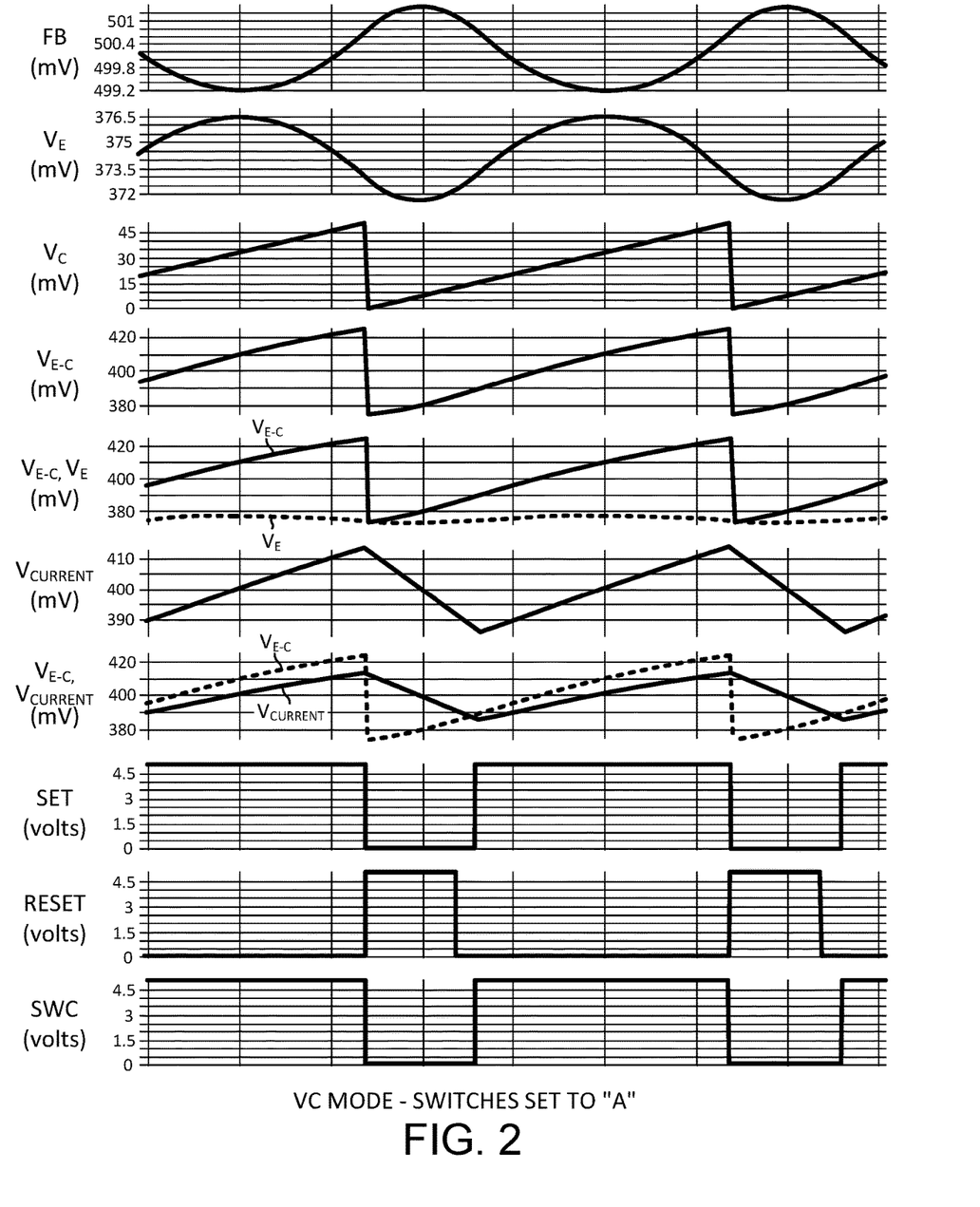
FIG. 2 is a waveform diagram that illustrates operation of the circuit of FIG. 2 when the voltage regulator control integrated circuit is operating in the valley current mode.

FIG. 2 is a waveform diagram that illustrates operation of the circuit 1 of FIG. 1 in the valley current (VC) mode. When the circuit 1 is operating in the VC mode, the switches SW1 and SW2 are both set to the "A" position. The beginning of a high pulse of the oscillating signal OSC resets the latch 18, thereby causing the switch control signal SWC to transition from a digital logic high to a digital logic low. The low side switch LSS 22 turns on, and the current SW begins to decrease. The voltage signal $V_{CURRENT}$ therefore begins to decrease. When the decreasing voltage signal $V_{CURRENT}$ crosses the error and compensated error voltage signal $V_{E-C}$, then the comparator circuit 15 asserts the set signal SET to a digital logic high. This sets the latch 18, and turns off the low side switch LSS 22 and turns on the high side switch HSS 21. The voltage signal $V_{CURRENT}$ then starts to increase again. The voltage signal $V_{CURRENT}$ increases until the next rising edge of the oscillating signal OSC. The period of time between successive rising edges of the oscillating signal OSC is fixed from cycle to cycle. The duty cycle is determined by the amount of time required, after the latch 18 is reset, for the decreasing voltage signal $V_{CURRENT}$ to cross the compensated error signal $V_{E-C}$. This is called "valley current mode" control because the signal $V_{E-C}$ causes the latch to be set in a "valley" of the $V_{CURRENT}$ signal.

Figure 3:
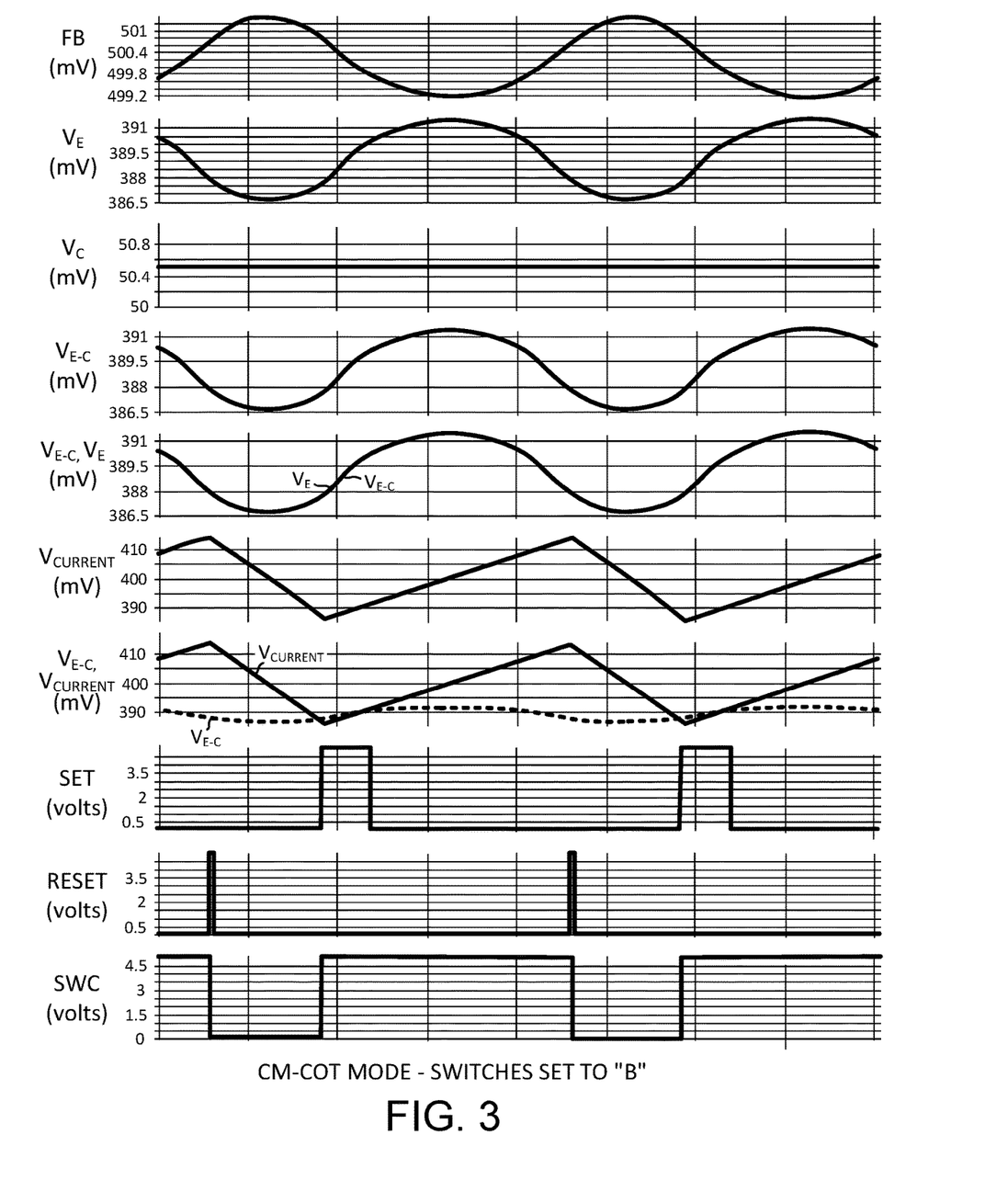
FIG. 3 is a waveform diagram that illustrates operation of the circuit of FIG. 2 when the voltage regulator control integrated circuit is operating in the current-mode constant on-time mode.

FIG. 3 is a waveform diagram that illustrates operation of the circuit 1 of FIG. 1 in the current-mode constant on-time (COT) mode. In the fifth waveform down from the top of the diagram, the $V_E$ and $V_{E-C}$ signals have the same, or almost exactly the same, waveform. When the circuit 1 is operating in the COT mode, the switches SW1 and SW2 are both set to the "B" position. When the high side switch 21 is on, it is on for a pre-defined fixed amount of time. This amount of time is set by the "delay time" of the delay and one-shot circuit 41. The on/off duty-cycle of the high side switch HSS 21 is regulated by changing the off time of the high side switch HSS 21. When the low side switch LSS 22 is turned on at the end of an on time of the high side switch HSS 21, the voltage signal $V_{CURRENT}$ begins decreasing. When the magnitude of $V_{CURRENT}$ decreases to the point that it reaches the magnitude of the compensated error voltage signal $V_{E-C}$, then the comparator circuit 15 switches and asserts the set signal SET high. This sets the latch 18, and causes the switch control signal SWC to transition from a digital logic low to a digital logic high. The amount of time that the high side switch HSS 21 was off is what adjusts the on/off duty-cycle.

The low to high transition of the switch control signal SWC turns on the high side switch HSS 21 and starts the next on time of the high side switch HSS 21. After another fixed amount of "delay time", as determined by the "delay time" of the delay and one-shot circuit 41, the delay and one-shot circuit 41 outputs a high pulse. Due to switch SW2 being set to the "B" position, this beginning of this high pulse is conducted onto the reset input of latch 18. The beginning of this high pulse causes the latch 18 to reset, and causes the high side switch HSS 21 to be turned off. Due to the inner wideband current control loop involving current sense circuit 19, this constant on-time control mode is called a "current-mode constant on-time" (CM-COT) control mode.

Although an example of the voltage regulator control integrated circuit 2 is set forth above that has a mode control integrated circuit terminal MODE 13, in another example there is no mode control integrated circuit terminal MODE 13. Rather, the digital logic value on the internal mode control conductor 45 is hardwired or otherwise set on-chip. An antifuse, an EEPROM element, a flash memory element, a mask programmable element, or a one-time programmable (OTP) element can be provided on-chip to set the digital logic value on conductor 45. In another example, the mode control integrated circuit terminal MODE 13 is provided, but it is not bonded out to a package terminal. Rather, bond wires disposed entirely within the integrated circuit package couple either a digital logic high voltage or a digital logic low voltage onto the MODE terminal 13. The semiconductor device manufacturer may produce one type of voltage regulator control integrated circuit, with some instances of those voltage regulator control integrated circuits being hardwired or preset to function in the VC mode, and with other instances of those voltage regulator control integrated circuits being hardwired or preset to function in the COT mode. Customers wanting voltage regulator control integrated circuits employing both types of control modes can be satisfied by the semiconductor device manufacturer with a single voltage regulator control integrated circuit design.

Although the particular embodiment of the voltage regulator integrated circuit of FIG. 1 involves a compensation signal generator circuit, in another embodiment the voltage regulator integrated circuit is programmably operable to operate in either the COT mode or the VC mode but yet it does not have a compensation signal generator circuit. If the desired target output voltage $V_{OUT}$ is greater than one half magnitude of the input voltage $V_{IN}$, then the integrated circuit need not have a voltage regulator compensation signal generator circuit. No switch SW1 32 and no summing circuit 30 are therefore required either. Accordingly, in one embodiment the voltage regulator integrated circuit is less versatile but it also does not have any voltage regulator compensation signal generator circuit, any switch SW1 32, or any summing circuit 30. Although an embodiment of the voltage regulator integrated circuit is described above that has both a high side switch HSS and a low side switch LSS, in another embodiment there is no low side switch LSS. Rather, a diode is disposed in the place of the low side switch LSS illustrated in FIG. 1. The cathode of the diode is coupled to switching node SW 38, and the anode of the diode is coupled to the ground node and conductor.

Although an embodiment of the voltage regulator integrated circuit is described above in which the switching current SW flowing on the integrated circuit is detected, or a part of this current SW is detected, in another embodiment no such switching current or portion thereof is detected, either directly or indirectly. Rather, another circuit is provided on the integrated circuit, and this other circuit generates a separate current, where this separate current emulates, or "mimics", the switching current SW. This other separate current is then detected and converted into the $V_{CURRENT}$ signal. The $V_{CURRENT}$ signal is still indicative of the magnitude of the switching current SW, but the $V_{CURRENT}$ signal is generated without measuring any part of the switching current SW, either directly or indirectly.

Although an example of the voltage regulator integrated circuit is described above in which the error signal voltage signal $V_E$ is supplied to the comparator circuit 15 on one conductor, and the compensated error voltage signal $V_{E-C}$ is present on the other side of the summing circuit 30 on a different conductor, in another example the error voltage signal $V_E$ is supplied to the comparator circuit 15 via a conductor, and the compensation voltage signal $V_C$ is made to compensate the error signal on that node and conductor such that it adds to the error voltage signal present on that same node and conductor, and thereby causes the resulting compensated error voltage signal $V_{E-C}$ also to be simultaneously present on the same node and conductor. The signals $V_E$ and $V_{E-C}$ are simultaneously present on the same single conductor, and this single conductor extends from the error amplifier circuit 14 all the way to the non-inverting input lead 37 of comparator 36. Although the signals $V_E$ and $V_{E-C}$ are not present on two different conductors in this example, the signal $V_C$ is present on a different conductor (namely, on the conductor that extends out of the compensation signal generator circuit 16).

Although an integrated circuit implementation of the regulator control portion of the circuit 1 of FIG. 1 is shown above, in other examples the regulator control portion is not implemented on an integrated circuit but rather is a printed circuit board level circuit. Although a specific example is set forth above involving a latch, the function of the latch can be performed by another type of sequential logic element (for example, a flip-flop) more generally. A condition of a given voltage level being stored on a particular storage node within the sequential logic element can be referred to as either the set state, or the reset state. The terms set and reset in this context are relative.

Although an example of the voltage regulator control integrated circuit 2 is described above as including the high side switch HSS 21 and the low side switch LSS 22, in other examples of the voltage regulator control integrated circuit these switches are disposed outside the integrated circuit. The voltage regulator control integrated circuit 2 may include a high side driver circuit for driving the gate of an external high side N-channel field effect transistor, and may also include a low side driver circuit for driving the gate of an external low side N-channel field effect transistor. Alternatively, the switch control signal SWC and/or its complement can be made to exit the voltage regulator control integrated circuit without any gate driver circuits being built into the integrated circuit.

Figure 4:
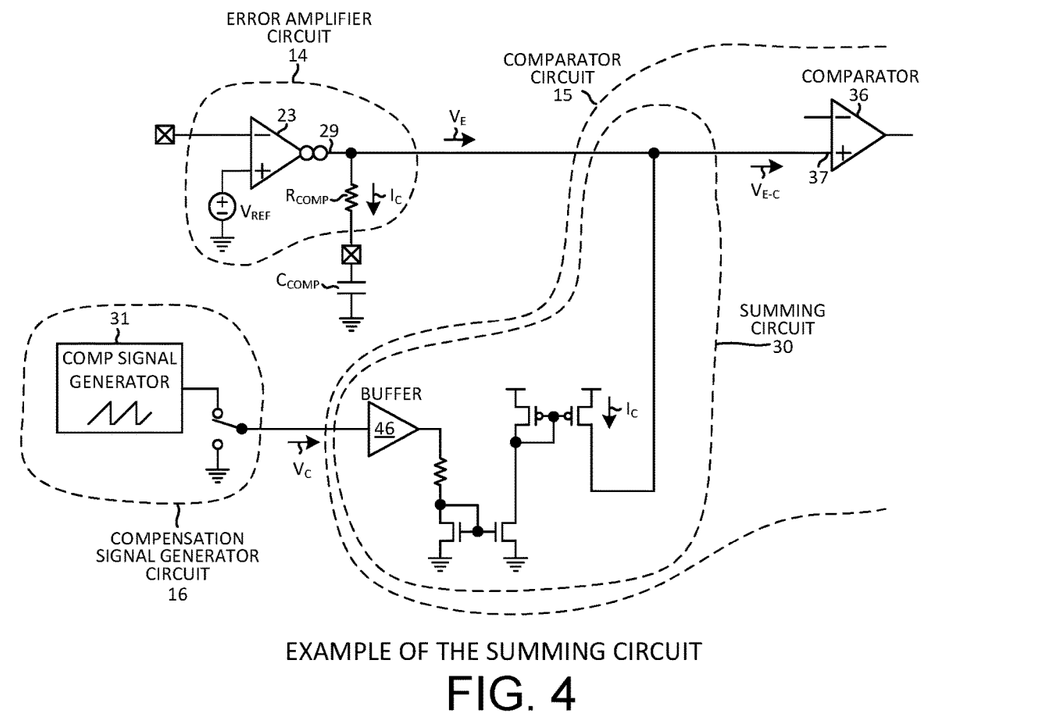
FIG. 4 is a circuit diagram of another example of a summing circuit of a comparator circuit.

FIG. 4 is a diagram of another example of the summing circuit 30 of the comparator circuit 15. The error amplifier circuit 14 supplies the error voltage signal $V_E$ to the comparator circuit 15 on the non-inverting input lead 37 of the comparator 36. The compensation signal generator circuit 16 supplies the compensation voltage signal $V_C$ to the comparator circuit 15 onto the input lead of buffer 46.

Figure 5:
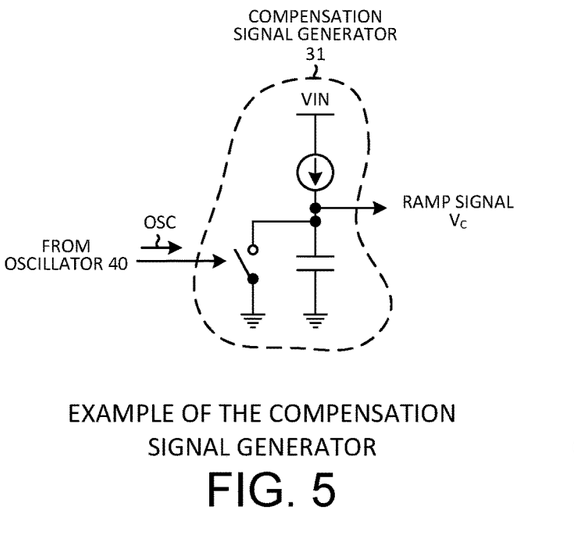
FIG. 5 is a circuit diagram of an example of a compensation signal generator circuit.

FIG. 5 is a diagram of an example of compensation signal generator 31.

Figure 6:
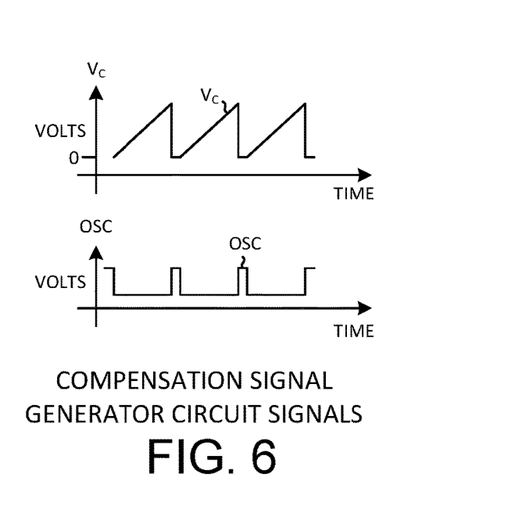
FIG. 6 is a waveform diagram of waveforms of the OSC signal in the circuit of FIG. 5, and the ramp signal $V_C$ as output by the circuit of FIG. 5.

FIG. 6 is a waveform diagram of waveforms of the OSC signal in the circuit of FIG. 5, and the ramp signal $V_C$ as output by the circuit of FIG. 5.

Figure 7:
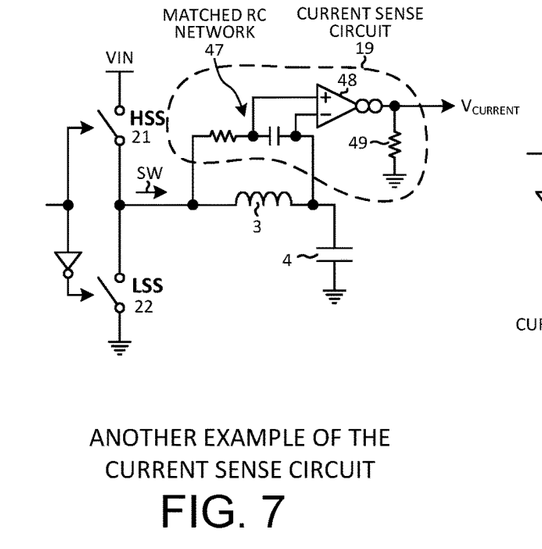
FIG. 7 is a circuit diagram of another example of a current sense circuit.

FIG. 7 is a diagram of another example of the current sense circuit 19. This circuit 19 does not directly measure any current, but rather it employs a matched RC network 47 to detect changes across the inductor 3. Voltage changes across the capacitor of the RC network are detected by the transconductance amplifier 48. Resistor 49 is used to convert the current signal as output by the transconductance amplifier 48 into the voltage signal $V_{CURRENT}$.

Figure 8:
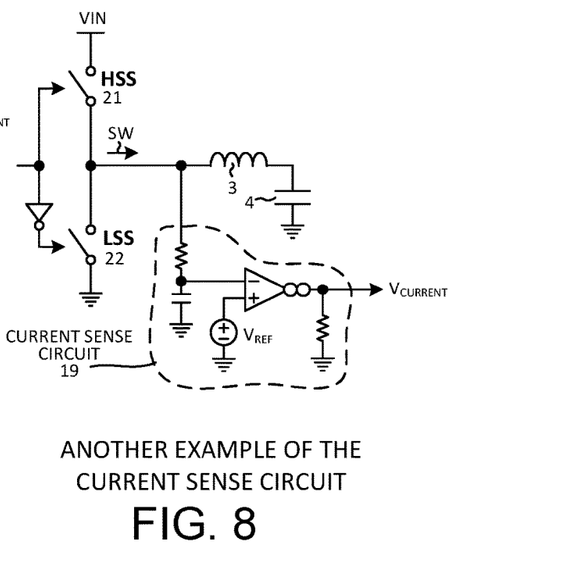
FIG. 8 is a circuit diagram of another example of a current sense circuit.

FIG. 8 is a diagram of another example of the current sense circuit 19.

Figure 9:
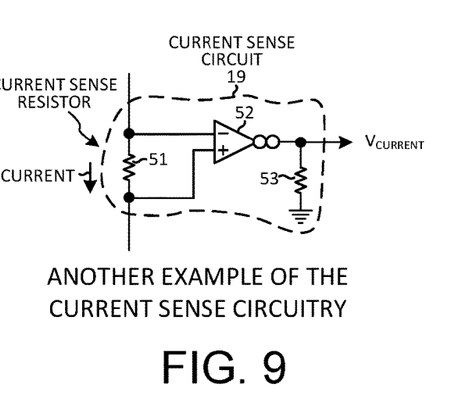
FIG. 9 is a circuit diagram of another example of a current sense circuit.

FIG. 9 is a diagram of another example of current sense circuit 19. This circuit 19 employs a current sense resistor 51. The voltage drop across this current sense resistor is detected by the transconductance amplifier 52 and resistor 53. The resulting voltage signal $V_{CURRENT}$ is indicative of current flow if the sense resistor is disposed in the path of the current SW flowing through inductor 3. The current sense resistor can be disposed in the current path either on the regulator side of the inductor 3, or it can be disposed in the current path between the inductor 3 and the output capacitor 4. Alternatively, the sense resistor can be disposed in the current path between the high side voltage node and the point labeled 38 in FIG. 1 so that the current being sensed is current flow through the high side switch HSS 21. The sense resistor can be disposed between the high side voltage node and the HSS switch 21. The sense resistor can also be disposed between the HSS switch 21 to the point 38. Alternatively, the sense resistor can be disposed in the current path between the point 38 and the low side voltage node so that the current being sensed is current flow through the low side switch LSS 22. The sense resistor can be disposed between the low side voltage node and the LSS switch 22. The sense resistor can also be disposed between the LSS switch 22 to the point 38. In all these cases, the resulting voltage signal $V_{CURRENT}$ is indicative of a magnitude of a current and is suitable for use in the current control loop.

Figure 10:
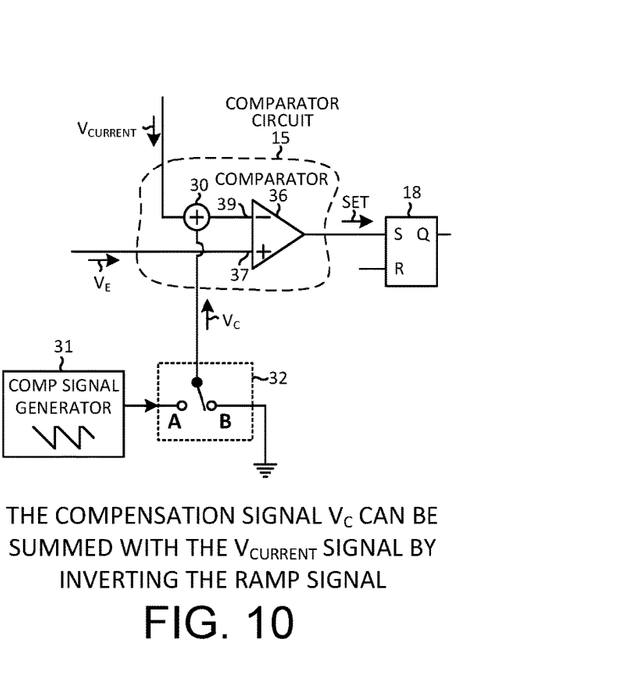
FIG. 10 is a circuit diagram that illustrates how the summing circuit of FIG. 4 can be disposed in the $V_{CURRENT}$ signal path into the non-inverting input lead of a comparator.

FIG. 10 is a diagram that illustrates how the summing circuit 30 can be disposed in the $V_{CURRENT}$ signal path into the non-inverting input lead 39 of comparator 36. In this case, the ramp signal as generated by circuit 31 is inverted as compared to the ramp signal in the example of FIG. 1. The ramp signal used in FIG. 10 has a sawtooth wave shape. Each tooth of the sawtooth ramp signal has a negative slope as illustrated in block 31 of FIG. 10.

Figure 11:
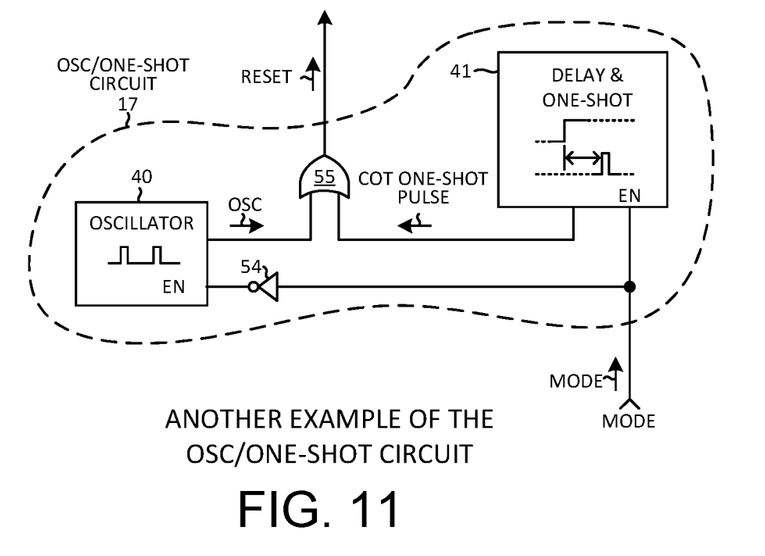
FIG. 11 is a circuit diagram of another example of a osc/one-shot circuit.

FIG. 11 is a diagram of another example of the osc/one-shot circuit 17. In this case, there is no switch SW2, but rather the two circuits 41 and 40 have enable input leads. If one of these circuits is not enabled, then that circuit outputs a digital logic low signal. Due to inverter 54, only one of the two circuits 40 and 41 is enabled at a given time. The signal from that enabled circuit passes through OR gate 55 and is supplied as the reset signal to the latch 18.

Figure 12:
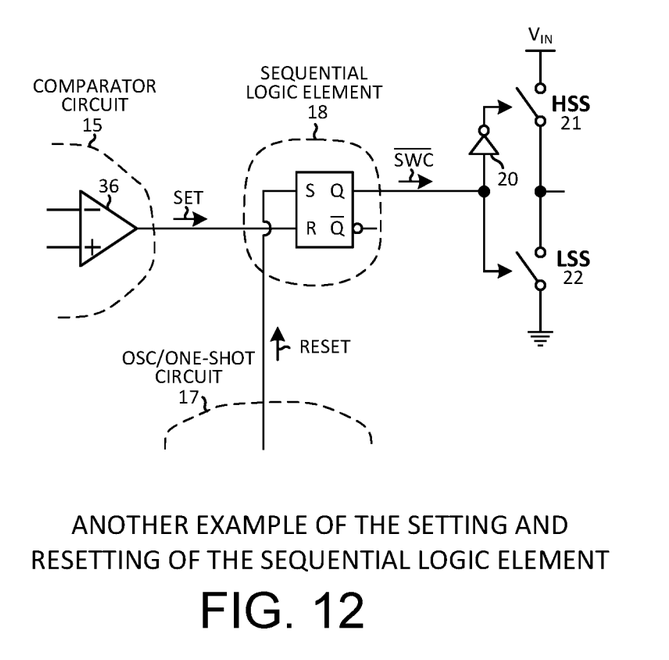
FIG. 12 is a circuit diagram that illustrates another way that the sequential logic element may be coupled to receive the set signal from a comparator circuit and to receive the reset signal from an osc/one-shot circuit.

FIG. 12 is a diagram that illustrates another way the sequential logic element may be coupled to receive the set signal from the comparator circuit 15 and to receive the reset signal from the osc/one-shot circuit 17. The logic employed by the sequential logic element in this case is inverted so that the set signal is supplied onto what is called the reset input lead of the sequential logic element, and so that the reset signal is supplied onto what is called the set input lead of the sequential logic element. The signal that is output from the sequential logic element is therefore in the inverted form. Accordingly, rather than placing the inverter 20 in the signal path to the low side switch LSS 22 as in the case of FIG. 1, the inverter 20 is placed in the signal path to the high side switch HSS 21. Alternatively, the same polarity of switching control signal as is shown in FIG. 1 can be output from the sequential logic element by outputting the switching control signal from the inverted data output lead of the sequential logic element. Functionally, what is labeled as the reset input lead of the sequential logic element is performing the function of receiving the SET signal. It is therefore functionally putting the sequential logic element into the set state. What is labeled as the set input lead of the sequential logic element is performing the function of receiving the RESET signal. It is therefore functionally putting the sequential logic element into the reset state.

Figure 13:
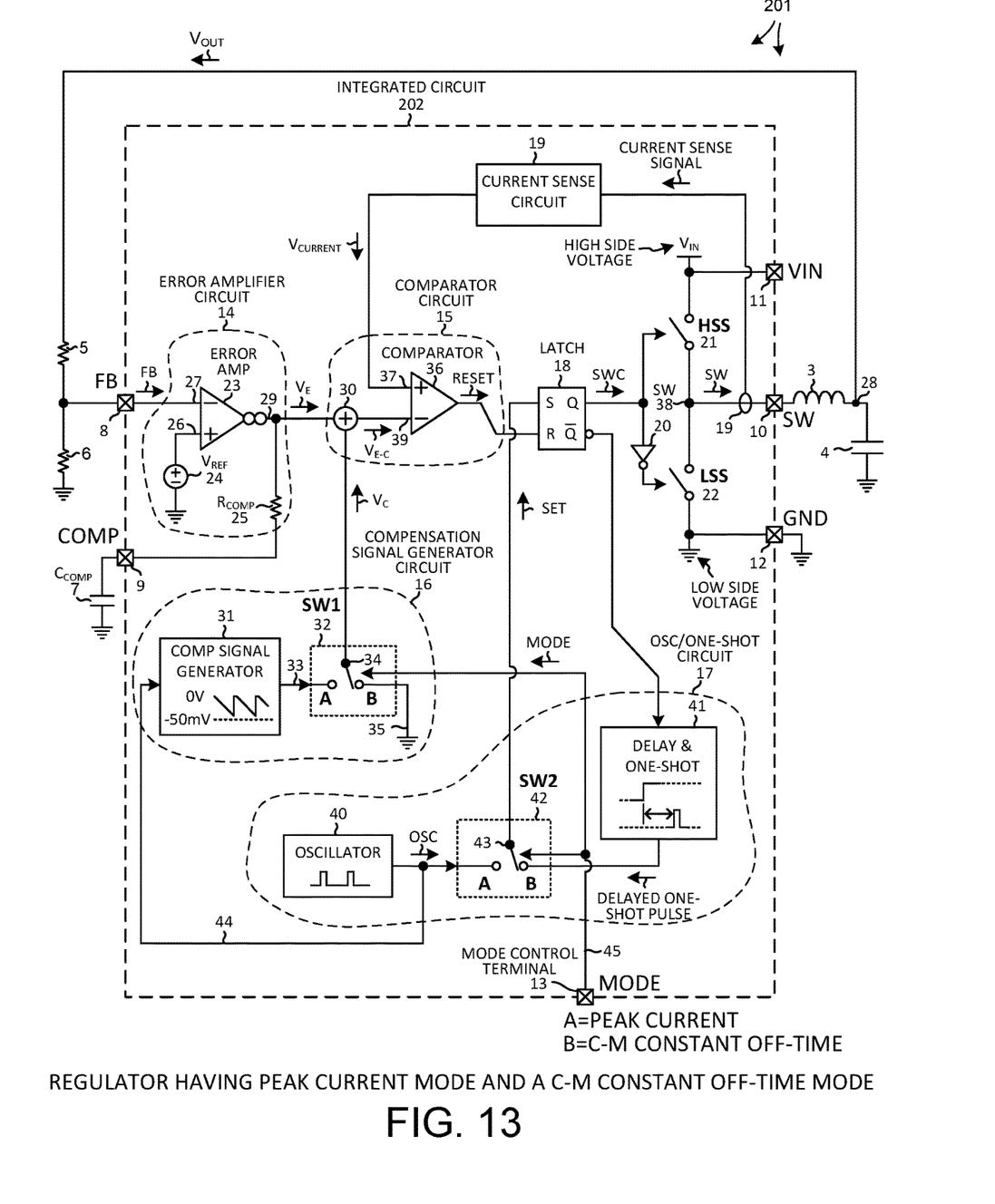
FIG. 13 is a circuit diagram of a DC-to-DC voltage converter circuit in accordance with a second novel aspect in which the circuit is operable in either a peak current mode or in a current-mode constant off-time mode.

FIG. 13 is a circuit diagram of a DC-to-DC voltage converter circuit 201 in accordance with a second novel aspect. In the circuit of FIG. 13, the voltage regulator control integrated circuit 202 is like the voltage regulator control integrated circuit 2 of FIG. 1, except that this voltage regulator control integrated circuit 202 is operable in a selectable one of either a peak current mode or a current-mode constant off-time mode. If the switches SW1 and SW2 are in the "A" position then the converter circuit 201 operates in the peak current (PC) control mode, whereas if the switches SW1 and SW2 are in the "B" position then the converter circuit 201 operates in the current-mode constant off-time control mode. The contents of like numbered circuit components in the two diagrams are the same as described above in connection with FIG. 1, except for the compensation signal generator circuit block 31. The compensation signal generator circuit block 31 of FIG. 13 generates a ramp signal that has a sawtooth wave shape, with each tooth having a downward slope. The ramp of the tooth starts at zero volts, and then decreases with a constant negative slope downward to about minus fifty millivolts. This sawtooth wave shape is illustrated schematically in the block 31 of FIG. 13. The comparator 36 is the same circuit as in FIG. 1, except that the $V_{CURRENT}$ signal is supplied onto the non-inverting input lead and the $V_{E-C}$ signal is supplied onto the inverting input lead. The comparator 36 supplies the RESET signal onto the reset input lead of the latch 18, whereas the osc/one-shot circuit 17 supplies the SET signal onto the set input lead of the latch 18. The signal that is output from the inverted Q data output of the latch 18 is used to trigger the delay and one-shot circuit 41.

Although the specific example of the DC-to-DC voltage converter circuit 201 of FIG. 13 involves a ramp signal that has sawtooth wave shape, with each tooth having a downward slope, the same technique explained above in connection with FIG. 10 can be applied to the converter circuit 201 of FIG. 13. A ramp signal that has a sawtooth wave shape, with each tooth having a positive slope, can be employed by moving the location of the summing circuit 30 of FIG. 13 from being in the signal path into the inverting input lead 39 so that it is then in the signal path into the non-inverting input lead 37. Also, as explained above in connection with FIG. 12, the signal as output from comparator 36 can be supplied onto the set input lead of the latch 18, and the signal as output by the osc/one-shot circuit 17 can be supplied onto the reset input lead of the latch 18. In that case the data output signals as output from the latch 18 would be inverted (as compared to what is shown in FIG. 13), so these signals should be inverted again before they are used to control switches, or to trigger the one-shot. The techniques and circuits of FIGS. 4-12 can be employed to realize the DC-to-DC voltage converter circuit 201 of FIG. 13 in different ways.

Figure 14:
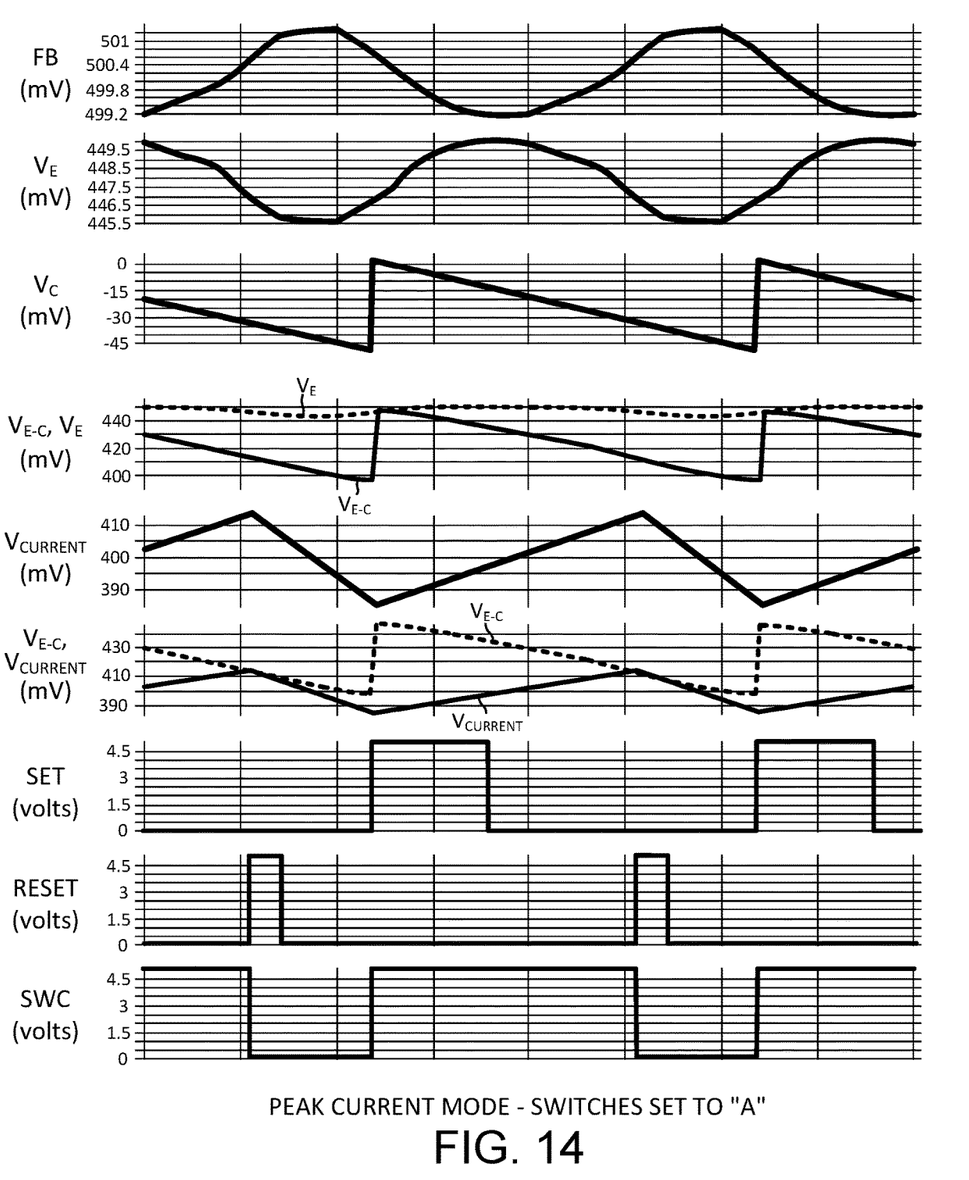
FIG. 14 is a waveform diagram that illustrates operation of the circuit of FIG. 13 in the peak current mode.

FIG. 14 is a waveform diagram that that illustrates operation of the circuit 201 of FIG. 13 in the peak current mode. When the rising $V_{CURRENT}$ crosses the compensated error signal $V_{E-C}$, then the comparator circuit 15 asserts the RESET signal to a digital logic high and causes the sequential logic element 18 to be reset.

Figure 15:
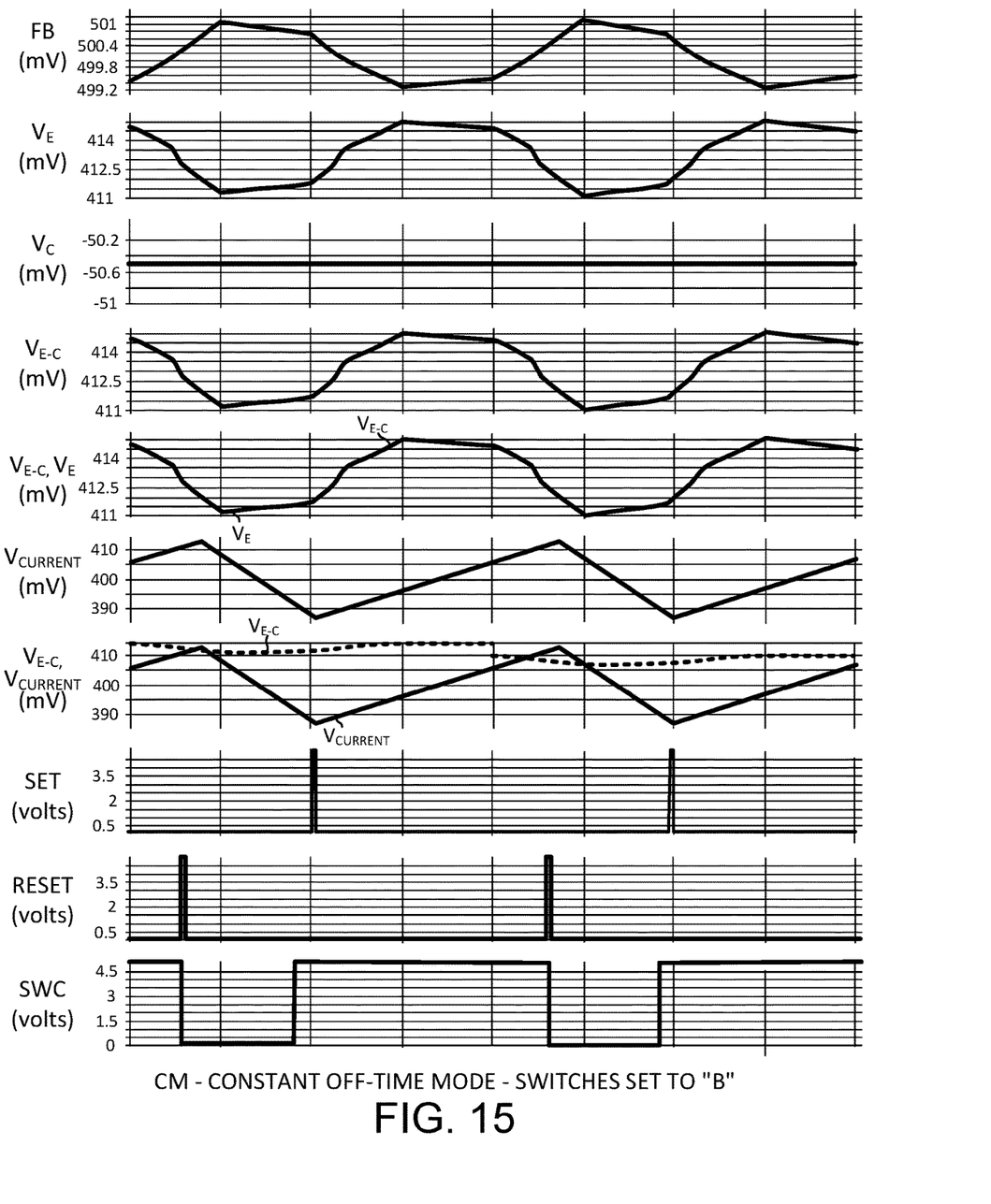
FIG. 15 is a waveform diagram that illustrates operation of the circuit of FIG. 13 in the current-mode constant off-time mode.

FIG. 15 is a waveform diagram that that illustrates operation of the circuit 201 of FIG. 13 in the current-mode constant off-time mode. When the sequential logic element 18 is in the reset state, then the high side switch HSS 21 is off. This is the so-called "off time". When the sequential logic element 18 is reset, then the delay and one-shot circuit 41 is triggered. After a constant amount of "time delay", the delay and one-shot circuit 41 outputs a high pulse. The rising edge of this high pulse passes through the switch SW2 and sets the sequential logic element 18. The "time delay" is constant from period to period. This control mode therefore is a "constant off-time" control mode. It is a "current-mode" constant off-time control mode due to the inner wideband current control loop involving current sense circuit 19.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A voltage regulator control integrated circuit having a peak current mode and a constant off-time mode, the voltage regulator control integrated circuit comprising:
    a sequential logic element having a set input lead, a reset input lead, and an output lead;
    a comparator circuit that supplies a reset signal RESET to the sequential logic element;
    a osc/one-shot circuit that supplies a set signal SET to the sequential logic element, wherein in the constant off-time mode the set signal SET is a delayed one-shot pulse signal, and in the peak current mode the set signal SET is a free-running oscillating signal;
    a compensation signal generator circuit that supplies a compensation voltage signal $V_C$ to the comparator circuit, wherein in the constant off-time mode the compensation voltage signal $V_C$ is an AC ground signal, and in the peak current mode the compensation voltage signal $V_C$ is a ramp signal;
    a current sense circuit that outputs a voltage signal $V_{CURRENT}$ indicative of a magnitude of a current, wherein the current sense circuit supplies the voltage signal $V_{CURRENT}$ to the comparator circuit; and
    an error amplifier circuit that supplies an error voltage signal $V_E$ to the comparator circuit.

2. The voltage regulator control integrated circuit of claim 1, further comprising:
    a mode control integrated circuit terminal MODE, wherein a signal received on the mode control integrated circuit terminal MODE determines whether the voltage regulator control integrated circuit operates in the constant off-time mode or in the peak current mode.

3. The voltage regulator control integrated circuit of claim 1, wherein the voltage regulator control integrated circuit is hardwired so that it only operates in one of the constant off-time mode and the peak current mode.

4. The voltage regulator control integrated circuit of claim 1, wherein:
    the comparator circuit generates an error and compensated error voltage signal $V_{E-C}$ by summing the error voltage signal $V_E$ and the compensation voltage signal $V_C$;
    the comparator circuit comprises a comparator;
    the error and compensated error voltage signal $V_{E-C}$ is supplied onto a first input lead of the comparator; and
    the voltage signal $V_{CURRENT}$ is supplied onto a second input lead of the comparator.

5. The voltage regulator control integrated circuit of claim 1, wherein the current is a current flowing on the integrated circuit.

6. The voltage regulator control integrated circuit of claim 5, wherein the current sense circuit comprises a circuit element taken from the group consisting of: a current sense resistor, a current mirror transistor, and a matched RC network.

7. The voltage regulator control integrated circuit of claim 1, wherein:
    the error amplifier circuit comprises a reference voltage generator, a differential transconductance amplifier, and a compensation resistor;
    the reference voltage generator is coupled to a first input lead of the differential transconductance amplifier; and
    the compensation resistor is coupled to an output lead of the differential transconductance amplifier.

8. The voltage regulator control integrated circuit of claim 7, further comprising:
    a feedback integrated circuit terminal FB, wherein a second input lead of the differential transconductance amplifier is coupled to receive a feedback signal from the feedback integrated circuit terminal FB.

9. The voltage regulator control integrated circuit of claim 1, wherein the compensation signal generator circuit is coupled to receive the free-running oscillating signal from the osc/one-shot circuit.

10. The voltage regulator control integrated circuit of claim 1, wherein:
    the compensation signal generator circuit comprises a ramp signal generator and a switch;
    in the peak current mode the switch is switched to receive the ramp signal from the ramp signal generator and to output the ramp signal onto a switch output node; and
    in the constant off-time mode the switch is switched to couple the switch output node to an AC ground node.

11. The voltage regulator control integrated circuit of claim 1, wherein:
    the osc/one-shot circuit comprises a one-shot circuit, an oscillator, and a switch;
    in the peak current mode the switch is switched to receive the free-running oscillating signal from the oscillator and to output the free-running oscillating signal onto a switch output node; and
    in the constant off-time mode the switch is switched to receive a delayed one-shot pulse signal from the one-shot circuit and to output the delayed one-shot pulse signal onto the switch output node.

12. The voltage regulator control integrated circuit of claim 1, further comprising:
    a high side switch HSS, wherein the high side switch HSS is operable to close and to supply a high side voltage onto a switching node SW; and
    a low side switch LSS, wherein the low side switch LSS is operable to close and to supply a low side voltage onto the switching node SW.

13. The voltage regulator control integrated circuit of claim 12, further comprising:
    a switching output integrated circuit terminal SW, wherein the switching output integrated circuit terminal SW is a part of the switching node SW.

14. The voltage regulator control integrated circuit of claim 1, further comprising:
a switching output integrated circuit terminal SW, wherein the sequential logic element outputs a switching output signal from the voltage regulator control integrated circuit via the switching output integrated circuit terminal SW.

15. An integrated circuit having a peak current mode and a constant off-time mode, the integrated circuit comprising:
an error amplifier circuit adapted to receive a feedback signal FB;
a compensation signal generator circuit adapted to output a compensation voltage signal $V_C$, wherein the compensation voltage signal $V_C$ is one of a ramp signal and an AC ground signal;
a comparator circuit adapted to receive an error voltage signal $V_E$ from the error amplifier circuit, and adapted to receive the compensation voltage signal $V_C$ from the compensation signal generator circuit;
a osc/one-shot circuit adapted to output a set signal SET, wherein the set signal SET is one of a free-running oscillating signal and a delayed one-shot pulse signal; and
a sequential logic element adapted to receive a reset signal RESET from the comparator circuit and adapted to receive the set signal SET from the osc/one-shot circuit;
wherein:
the sequential logic element outputs a switch control signal SWC;
in the constant off-time mode the error amplifier circuit, the compensation signal generator circuit, the comparator circuit, the osc/one-shot circuit, and the sequential logic element are configured to operate together as a constant-off time mode regulator control circuit; and
in the peak current mode the error amplifier circuit, the compensation signal generator circuit, the comparator circuit, the osc/one-shot circuit, and the sequential logic element are configured to operate together as a peak current mode regulator control circuit.

16. The integrated circuit of claim 15, further comprising:
a mode control integrated circuit terminal MODE, wherein a signal received on the mode control integrated circuit terminal MODE determines whether the integrated circuit operates in the constant off-time mode or in the peak current mode.

17. The integrated circuit of claim 15, wherein the integrated circuit is hardwired so that it only operates in one of the constant off-time mode and the peak current mode.

18. The integrated circuit of claim 15, wherein the set signal SET is the free-running oscillating signal if the integrated circuit is operating in the peak current mode, and the set signal SET is the delayed one-shot pulse signal if the integrated circuit is operating in the constant off-time mode.

19. The integrated circuit of claim 15, wherein:
the integrated circuit is hardwired to operate in the constant off-time mode; and
a ramp signal generator of the compensation signal generator circuit is disabled.

20. The integrated circuit of claim 15, wherein:
the integrated circuit is hardwired to operate in the peak current mode; and
a one-shot circuit of the osc/one-shot circuit is disabled.

21. A voltage regulator control circuit having a peak current mode and a constant off-time mode, the voltage regulator control circuit comprising:
a sequential logic element that has a set state and a reset state;
a comparator circuit that supplies a reset signal RESET to the sequential logic element;
a osc/one-shot circuit that supplies a set signal SET to the sequential logic element, wherein in the constant off-time mode the set signal SET is a delayed one-shot pulse signal, and in the peak current mode the set signal SET is a free-running oscillating signal;
a compensation signal generator circuit that supplies a compensation voltage signal $V_C$ to the comparator circuit, wherein in the constant off-time mode the compensation voltage signal $V_C$ is an AC ground signal, and in the peak current mode the compensation voltage signal $V_C$ is a ramp signal;
a current sense circuit that outputs a voltage signal $V_{CURRENT}$ indicative of a magnitude of a current, wherein the current sense circuit supplies the voltage signal $V_{CURRENT}$ to the comparator circuit; and
an error amplifier circuit that supplies an error voltage signal $V_E$ to the comparator circuit.

* * * * *